Jan. 8, 1935. C. L. RICE 1,987,127
MEANS FOR CONNECTING CONDUCTORS AND THE LIKE
Filed Oct. 14, 1931 2 Sheets-Sheet 2
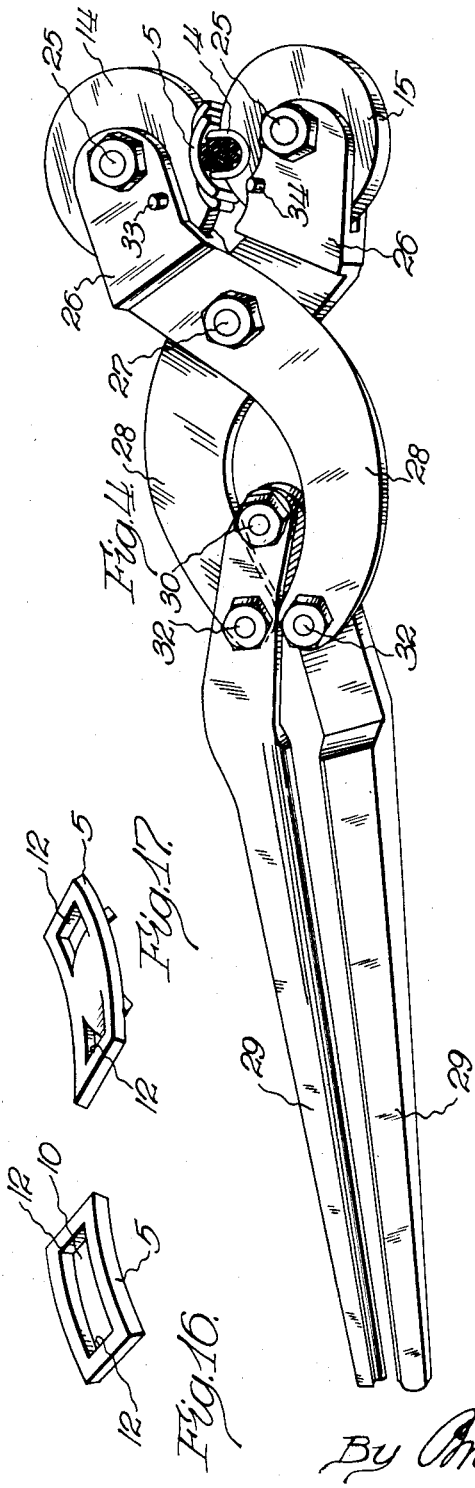
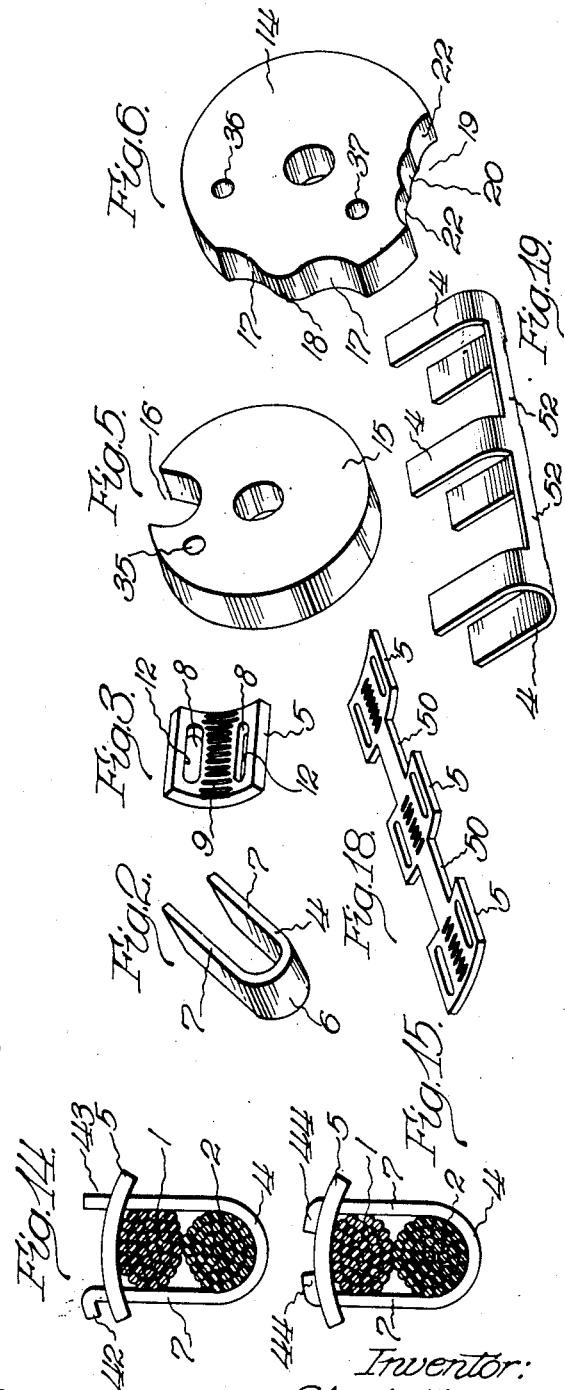
Inventor:
Charles L. Rice Patented Jan. 8, 1935

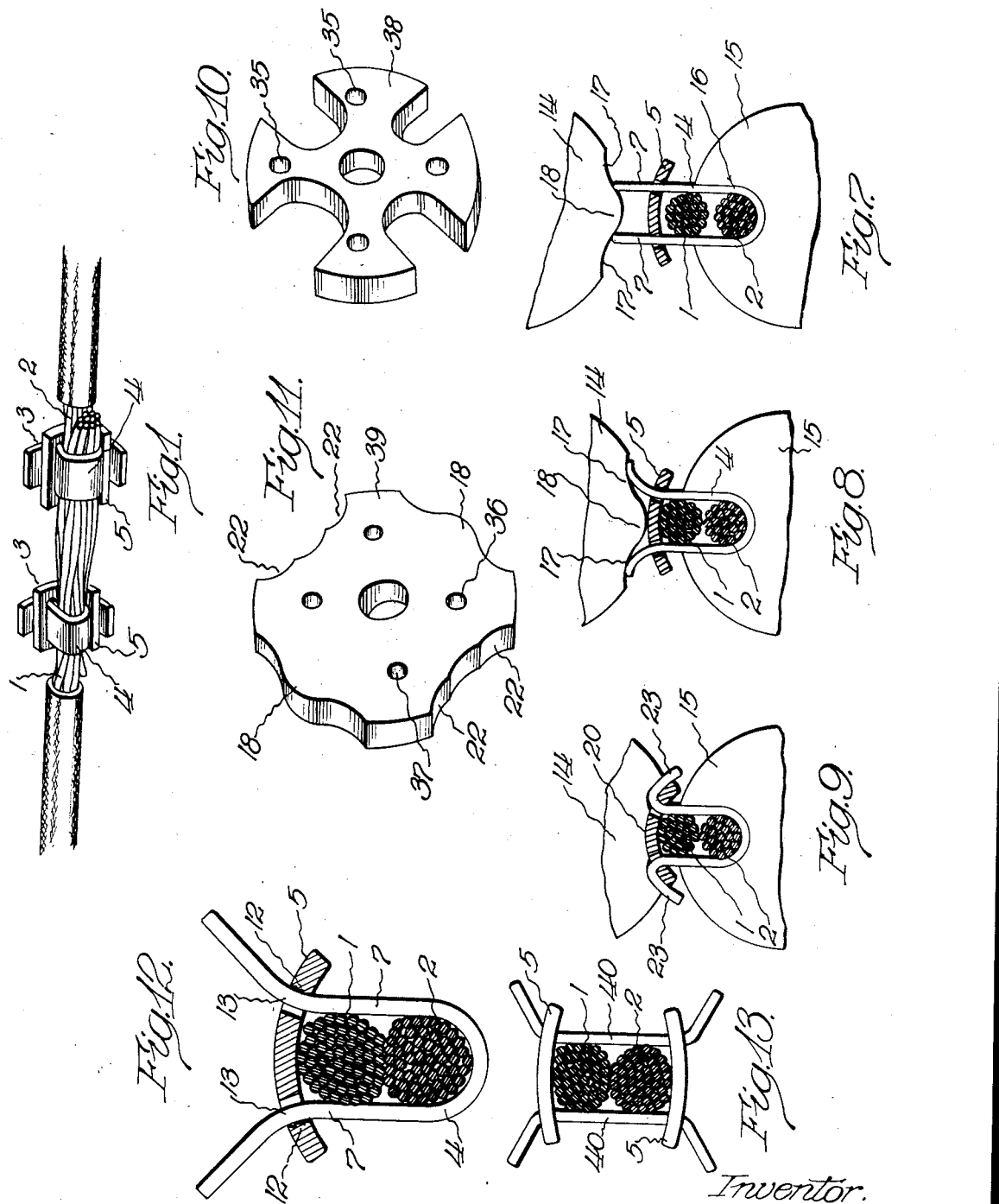

1,987,127

UNITED STATES PATENT OFFICE 1,987,127

MEANS FOR CONNECTING CONDUCTORS AND THE LIKE

Charles L. Rice, Jackson, Mich.

Application October 14, 1931, Serial No. 568,681

10 Claims. (Cl. 173—263)

My invention relates to connectors for electric conductors and the like.

While I shall show herein as a specific embodiment of my invention a connector for connecting two strands electrically, it is to be understood that the two strands may be purely mechanical in their function or that the connector and the means for operating the same may be employed for other purposes.

Heretofore, in the coupling or connecting of electrical conductors, screw-threaded clamp means of various types have been employed. One of the chief objections to screw-threaded or bolted connectors is the expense involved in constructing a satisfactory connector. Furthermore, such connectors being composed of a number of parts, are subject to likelihood of loss of a part. Furthermore, where screw-threaded parts are employed, the operation of tightening up the same is difficult as each end of the connector must be held by a wrench. It therefore requires both hands of the operator for the tightening operation without having any means for supporting the parts to be connected or the connector itself.

Due to the necessity for extensive machining operations in manufacture, connectors of the prior art are prohibitively expensive when considering the simple functions which they perform, and I have conceived the possibility of providing a connector in which the clamping function, that is, the obtaining of a relatively high pressure between the conductors to be connected, is secured by means other than a screw-threading operation.

I have conceived the possibility of mechanically stapling or clamping the conductors to be united or a single conductor to be clamped, by simple and inexpensive means.

It is necessary, in connecting two conducting parts permanently, as in joining two power conductors, to gain a very considerable degree of mechanical pressure between the parts and to hold the same with a certain degree of elasticity so that through vibration, temperature changes, etc., the grip of the connecting means does not become relaxed. In devices of the prior art and in common use, it is not unusual, where rigid connectors are employed, to have the same relax their grip due to temperature changes and the like with consequent loss in conductivity.

One of the features of my invention resides in the provision of an elasticity of the grip of the connector upon the conductor or conductors to retain a tight hold upon the member or members embraced by the connector even throughout temperature changes, vibration and the like.

In the preferred embodiment of my invention, I provide a simple U-shaped strap or band and a yoke or buckle, the buckle preferably being made of hard springy metal and the strap of soft bendable or ductile metal, the buckle and strap being threaded together, pressed upon the part or parts to be connected, and the ends of the strap bent over or clinched in such a manner as to increase the tension which is put upon the strap and to put the relatively stiff buckle under a bending stress to retain the pressure of the connector upon the parts engaged thereby under the various conditions to which the connection is subjected.

In addition to the connector itself, I have provided a simple tool or machine for manipulating the parts of the connector and providing the necessary force for causing the same to grip the part or parts to be connected with sufficient power to maintain thereafter a satisfactory joint. I do not intend to be limited to the particular form of buckle and strap herein shown, nor to the particular form of fastening tool. The power for applying the connector may be secured through the use of various lever arrangements, screw-thread arrangements, or hydraulic jack arrangements, or the like, all without departing from my invention.

Now in order to acquaint those skilled in the art with the manner of constructing, operating and utilizing my invention, I shall describe in connection with the accompanying drawings a specific embodiment of the same and the manner of practicing the same.

In the accompanying drawings:—

Figure 1 is an isometric view of a joint between two conductors made by the use of two connectors of my invention;

Figure 2 is an isometric view of the strap or band element;

Figure 3 is a like view of the buckle or yoke element;

Figure 4 is a similar view of a pair of tongs for applying the connector of my invention;

Figures 5 and 6 are isometric views of the two die members employed in the tongs of Figure 4;

Figure 7 shows the strap, buckle and conductors assembled and the die members starting to press the parts together;

Figure 8 is a similar illustrative view showing the operation of pressing the conductors together and contracting the connector upon the same;

Figure 9 shows the final operation of clinching over the ends of the strap or band to tighten the connector upon the conductors;

Figures 10 and 11 are isometric views of co-operating die members like Figures 5 and 6, but showing die cavities for different sizes of connectors;

Figure 12 is a cross-sectional view through a modified form of connector as the same is being closed upon two conductors;

Figure 13 is an end view of a modified form of connector;

Figure 14 is an end view of a connector of the type shown in Figure 7 with one end bent over to keep the two parts connected so that they may not become disconnected by the lineman or operator;

Figure 15 shows a modified manner of closing up the connector;

Figures 16 and 17 are isometric views of modified forms of the yoke or buckle;

Figs. 18 and 19 are isometric views of multiple buckle and strap members, respectively.

Referring now to the drawings in which like reference numerals designate like parts, Figure 1 shows two stranded conductors 1 and 2 having their ends overlapping and coupled or connected together by a pair of connectors 3—3, these connectors being formed of two parts, namely, a strap part 4 and the body or buckle 5. As shown in Figure 2, the strap is a U-shaped piece of relatively soft bar or strap copper or the like, bent into hair-pin or staple shape with a cylindrical bottom portion 6 and straight side or leg portions 7. The cylindrical portion 6 is preferably of substantially the same radius as the conductor or rod-like element which is to be embraced by the same. Obviously, a pair of conductors or a single conductor or rod-like element may be gripped by the connector or clamp 3, or, on the other hand, more than two strands or rod-like elements may be coupled together, all without departing from the invention.

The buckle or body portion 5 is a relatively heavy piece of hard springy material, such as hard drawn copper or brass, with a pair of slots 8—8 formed at opposite sides for the reception of the legs 7—7 of the strap 4. The concaved side of the buckle or yoke member 5 may be corrugated or roughened or otherwise shaped to increase the frictional engagement as by reducing the area of contact, providing sharp corners or the like, as indicated at 9, where engagement between this buckle and the conductor occurs. The slots 8—8 are preferably so located as to be adapted to receive the legs 7—7, and in the preferred form of the invention these slots, although being substantially parallel sided individually, are substantially radial to the curvature of the body and assist in spreading the arms 7—7 when the parts are connected together, as will be described later.

This feature of construction may obviously be varied within the scope of the invention and, instead of having a pair of slots, the entire central part of the yoke may be open as indicated at 10 in Figure 16, to form a modified form of buckle 5 as shown in said figure.

It is desirable that the body or buckle 5 contain a certain degree of elasticity or springiness in order to retain an elastic grip upon the conductors, such as 1—2 or other strands or rod-like elements which are gripped by the connector. The reason for this is obvious, as the connector is subjected to variations of temperature, to vibrations and the like, which would tend to loosen the grasp of the connector upon the wires if a high degree of pressure and a certain degree of elasticity in the connector were not provided.

It is desirable that the edges 12—12 against which the legs 7—7 bear when the connector is tightened up, be spaced apart a distance substantially equal to the diameter of the strand or rod-like element to be clamped plus the thickness on each side thereof of the legs 7—7. This is for the purpose of causing the outward expansion of the conductor, such as 1, under the compression force of squeezing the buckle 5 down upon it as shown in Figure 12, to press the arms 7—7 outwardly against the edges 12—12, the ends of the arms being bent over such edges 12—12 in an outward direction as indicated at 13—13 in Figure 12. In Figure 12 the outer edge 12—12 has been shown as roughened or provided with corrugations running along the edge so as to assist in gripping the outer surface of the arms 7—7 as they are bent over. This is a refinement which is non-essential and which is not employed in the preferred embodiment of the invention, but it illustrates the action which occurs, namely, that as the arms 7—7 are spread outwardly as the buckle 5 is pressed down as will be described later in connection with Figure 8, these arms 7—7 have a ratchet action in catching the buckle 5 and holding against the same until the final operation shown in Figure 9 is accomplished.

The means for closing the connector 3 upon a pair of conductors or other elements preferably comprises a pair of die members such as illustrated in Figures 7, 8 and 9 at 14—15. The die member 15 has a notch or recess 16 of a shape adapted to support the bottom of the strap 4 when the conductors, such as 1 and 2, are embraced between the sides of the same. The die member 14 has a nose 18 with flanking cam surfaces 17—17, the nose 18 being adapted to be pushed down between the ends of the arms or sides 7—7, as shown in Figure 8, the nose 18 pressing against the top of the buckle 5 to compress the conductors 1—2 within the strap 4 and the flanking cam surfaces 17—17 deflecting the sides 7—7 outwardly to secure the frictional engagement of the same with the edges 12—12 of the slot of the buckle or body portion 5.

The final operation of clinching over the ends of the arms 7—7, which tightens up the connector, is shown in Figure 9. In this case a cam surface of a different shape formed upon the periphery of the member 14 is brought into play, this cam surface being shown to better advantage at 19 in Figure 6 and consisting of a central cam surface 20 and flanking cam surfaces 22—22. These flanking cam surfaces 22—22 are adapted to bend over and clinch the ends as indicated at 23—23 in Figure 9, thereby performing the final tensioning of the strap member and springing of the buckle 5, the central cam-shaped surface 20 being adapted to engage when the action is complete against the central part of the buckle 5. It is not essential that the surface 20 engage the buckle 5 as the purpose of the second operation, namely, the clinching over of the ends 23—23 is amply and adequately accomplished by the cam surfaces 22—22.

Now it is to be observed that two rather obscure but advantageous actions have been accomplished. In the bending over of the ends 23—23 of the relatively thick soft metal strap, there is accomplished a tightening of the strap, since the thick strap will not readily bend around a sharp corner and the tendency in bending the same around the edges 12—12 is to tighten the strap against the buckle. This is because in the bending over of the free ends of arms 7 the corner of edges 12 catches upon the outer surface of the arm and acts as a fulcrum around which the arm represented by the thickness of the arm 7 swings, thereby increasing very considerably the tension of the inner terminal of which the arm 7 may be considered to be composed. The second action is that the buckle 5 is preferably put under such stress as to slightly spring, that is flex, the same, so that it will maintain a secure grip upon the conductors 1—2, even though the connection is subject to vibration, changes of temperature, etc.

A means by which the setting or fixing of the connector may readily be accomplished is illustrated in Figures 4, 5 and 6. In this construction a pair of cam discs 14 and 15, normally fixed but rotatable upon pins or bolts 25—25 extending through holes in the discs 14 and 15, are mounted in the ends of a pair of levers 26—26, these levers being hinged or pivoted upon a hinge pin or bolt 27 and having their longer arms 28—28 hinged or pin-jointed to a compound lever mechanism consisting of handle members 29—29 pivoted at their remote ends on a pin or bolt 30 and pinned or coupled intermediate their ends by means of the pins or bolts 32—32, the whole apparatus constituting a compound lever for exerting a very high degree of pressure between the cam members 14 and 15. These cam members 14 and 15 are adapted to be held in alignment as by means of pins such as 33—34 which extend through the adjacent ends of the levers 26—26 and through suitable holes such as 35—36—37 in the discs 14 and 15.

I do not wish it to be understood that I am to be restricted to this particular form of tongs or setting means, as, obviously, any suitable means for exerting a high degree of pressure between the cam members may be provided. In the form shown the cam member 14 is adapted to be rotated so as to bring successively the two cam surfaces 18 and 22 in register with the cam surface 16 on the member 15.

Obviously, a parallel motion device might be employed where the successive operations are to be performed at successive locations on the jaws of such a device. A jack screw or hydraulic ram may also be employed for creating the necessary pressure. Also, instead of applying pressure gradually, it may be applied by impact as by hammer blows or the like. Also, it may be found desirable in advance of applying the connector to crush together as by pressing or hammering the conductors 1 and 2 so as to secure an extensive bearing between them before the application of the connector, and I consider the same as a part of the present invention. This may be performed between suitable die members, which form or pinch together the two conductors 1 and 2, the form of which die members will be obvious to those skilled in the art.

In Figures 10 and 11 I have shown die members for use with the tongs shown in Figure 4 or in other instrumentalities die members 38 and 39 which are like the die members 15 and 14 except that they have cam surfaces adapted to cooperate with different sizes of conductors and, consequently, different sizes of connectors. The depth of the recesses in the lower or holding die member may be graduated to correspond to the number of strands or conductors to be coupled. The width of the recesses in the member 38 is in each case controlled by the diameter of the conductor to be coupled. The cam member 39 shown in Figure 11 has two sets of spreading die members 18—18 and two sets of clinching die members 22—22, as two sizes may suffice for the four sizes of connectors to be used in connection with the four notches shown in member 38.

It is to be understood that, instead of a U-shaped strap and a single buckle, two buckles such as 5—5, shown in Figure 13, with a pair of parallel straps 40—40 may be employed to secure the same general results. This requires a greater number of parts and a little different manipulation. If desired, the sides 40—40 may be T-shaped and assembled with one of the buckles 5, to make up a composite U-shaped member, the pieces of which do not come apart.

To avoid the necessity for threading the two parts 4—5 together or of assembling two separate parts, one of the legs 7 may be initially bent over or hooked as shown at 42 in Figure 14, or it may have a T-shaped head to keep the strap member 4 and the buckle 5 connected together so that all that is necessary is to thread the single straight side, as indicated at 43, through the corresponding part of the buckle 5 and then the operation may proceed substantially as shown in Figures 7, 8 and 9 to bend over and clinch the ends of the strap upon the buckle. Obviously, also, the one end of the strap may be hooked permanently to the corresponding end of the buckle and the entire take-up made from the opposite end of the strap if so desired.

In Figure 17 I have shown a modification in which the buckle is provided with a separate saddle or engaging portion formed by striking down lugs sheared free of the edges 12—12, which edges 12—12 are engaged by the legs 7—7 of the strap 4. In this case the sides extending above the saddle portion provide the desired spring or take-up effect. Due to its initial upwardly bent position it provides a greater amount of take-up.

In Figure 15 I have illustrated how the ends of the arms 7—7 may be bent or clinched inwardly as indicated at 44 to connect the parts together, but this is not so advantageous, as the inner edges of the slots 8—8 do not provide the same leverage as the outer edges of the slot as against the reaction of the buckle 5.

In Figures 18 and 19 I have shown multiple buckle and strap members, respectively. I contemplate within the invention the manufacture of a continuous strip, as shown for example in Figure 18, in which the buckle portions 5 corresponding to the buckle 5 of Figure 3 joined by integral strips or necks 50—50 are made in suitable lengths from which the operator may cut off one or more buckle portions. At the same time, the strap members, such as the strap member 4, are likewise made out of a continuous strip of sheet metal and neck portions 52, as shown in Figure 19, are left integral with the straps 4—4, so that the lineman may cut off of a continuous strip whatever multiple of the strap 4 he wishes. The advantage of this construction resides further in that there is a conductive connection, namely, the necks 50 and 52 between the component parts of a multiple connector. The parts of each multiple connector consisting of buckles 5 and straps 4 may be individually fastened by a suitable setting tool, such as the one shown in Figure 4 or by any other suitable device, the neck portions 52 and 50 spacing the component parts, so as to make the application of the multiple connector easy and rapid. The neck portions 52 and 50 may be cut readily by a lineman's pliers, or other tool, or they may be sufficiently weakened in manufacture to be broken off by bending back and forth with the fingers.

I contemplate making the buckles and straps of continuous strips of stock, and may cut them substantially free of each other without having the same spacing for the straps and the buckles, within the invention, but the form herein shown, namely, the spacing of these parts to register with each other, so that the multiple buckle tends to secure greater conductivity than the corresponding number of individual units, is a preferred construction. The necks 50—50 tend to bear upon the conductor, as also do the necks 52—52, thereby further increasing the area of contact.

The invention is capable of modification and improvements may be made, as will be apparent to those skilled in the art, in the carrying out of the procedure and in the construction of the elements which I have described and in the making of the connector, and I do not wish to be understood as limiting the claims to the details herein shown, except as they are specifically recited in the appended claims.

I claim:

1. In combination with a conductor to be gripped, an arched buckle member of flat stiff stock having slots at its opposite sides spaced apart a distance substantially equal to the diameter of the conductor to be gripped, a U-shaped strap of flexible strip stock having the legs thereof forced through the slots in the yoke and frictionally engaging the outer sides of the slots, the ends of the legs being bent over the ends of the buckle and the strap being tensioned by the bending over of the ends to grip the conductor firmly.

2. Means for compressing two power conductors into firm electrical engagement, comprising a buckle member of substantially flat stock and arched between its ends for gripping a rod-like conductor, a U-shaped strap member cooperating with said buckle member to embrace the conductors, said buckle member having a pair of slots through which the ends of the strap member extend, the arched portion of the buckle member being adapted to rest against the curved portion of one of the conductors, said buckle member being of spring material, said members being adapted to be drawn together against a conductor embraced thereby to force the arched portion of the buckle firmly against such conductor, and the ends of said strap member being adapted for bending over the end of the buckle member to draw and hold the members together under tension.

3. In a clamp of the class described, the combination of a resilient yoke member having openings adjacent its ends and a central engaging portion therebetween, and a U-shaped strap member having leg portions lying substantially parallel to each other and having the ends thereof extending through said openings in said yoke member, said ends being adapted to be bent over the outer surface of said yoke member to impart a bending stress to said yoke member to draw said U-shaped member toward the engaging portion of said yoke member with the means to be clamped confined between said members.

4. Means for clamping two members into engagement comprising a buckle of spring material, a U-shaped strap cooperating with said buckle to embrace said members, said buckle having means for receiving the extending ends of said strap, the central portion of said buckle resting against one of said members, the ends of said strap being adapted to be bent over said buckle to impart a bending stress thereto for resiliently drawing said buckle and strap together to compress said members therebetween.

5. In combination, a yoke or buckle member comprising a piece of relatively hard springy sheet metal, said member having attaching bars at its ends, a sheet metal strap member comprising a U-shaped strip of relatively soft metal, the legs of the U-shaped member lying substantially parallel to each other and the bottom of the U-portion being of a radius substantially equal to the radius of a piece to be clamped, the legs of said strap member being adapted to be bent over said bars to bend and resiliently hold the yoke or buckle member against the piece to be clamped.

6. A clamp for clamping a plurality of substantially cylindrical objects in parallel relation to each other, comprising a yoke member of springy material curved to a radius greater than that of the radius of the cylindrical objects and having anchoring bars at its ends, and a U-shaped strap member, the bottom of the U-portion being curved to a radius substantially equal to that of the cylindrical objects, the legs of the U-shaped member being adapted to lie parallel to each other on opposite sides of said objects and the ends thereof being adapted to be clinched over said anchoring bars.

7. In combination a yoke or buckle member comprising an approximately flat piece of hard springy metal having an oblong perforation at each end, said perforations providing substantially parallel cross bar portions at said ends, a strap member comprising a U-shaped strip of relatively soft metal, the legs of the U-shaped strip being adapted to be passed through said perforations until the strip and the member engage the means to be clamped, the ends of the strip being adapted to be clinched over said cross bars to flex the member and to tension the strip against the resistance of the means to be clamped.

8. In combination for clamping a cable, a buckle member comprising an oblong piece of resilient wrought metal having perforations at its ends, a tension member of relatively soft thick metal having its ends adapted to be passed through said perforations and clinched over to flex the buckle member against the cable and to put the tension member under tension.

9. In combination for clamping one or more substantially cylindrical rodlike members, a buckle member comprising an oblong piece of resilient wrought metal having perforations at its ends, a U-shaped staple member of relatively thick non-resilient metal, said staple member being adapted to have its arms passed through the perforations in the buckle member until the buckle and staple members are stopped by the resistance of the members to be clamped, said perforated ends lying out of contact with the members to be clamped, said ends of the staple being adapted to be clinched over the ends of the buckle member to flex the buckle member and to put the staple under tension, said tension being maintained by the resiliency of the buckle member.

10. In combination for clamping together two plies of cable, a springy oblong flat metal yoke having slot-like perforations at its ends, said slots being spaced apart by approximately the diameter of the cable, a U-shaped soft sheet metal strap having substantially parallel legs adapted to be passed through said perforations and the ends thereof being adapted to be clinched over the ends of the yoke, the strap being thick enough that when the ends are clinched over they produce a transverse bending of the yoke and a longitudinal tensioning of the strap.

CHARLES L. RICE.